VARIABLE SWEEP GENERATION AMPLITUDE CONTROL

Filed Dec. 20, 1962

2 Sheets-Sheet 1

INVENTORS
ANTHONY D. AUTORINO
ARTHUR A. KLEBBA
BY [signature]
ATTORNEY

VARIABLE SWEEP GENERATION AMPLITUDE CONTROL

Filed Dec. 20, 1962

INVENTORS
ANTHONY D. AUTORINO
ARTHUR A. KLEBBA
BY Roger A. Van Kirk
ATTORNEY

United States Patent Office 3,217,271

Patented Nov. 9, 1965

3,217,271
VARIABLE SWEEP GENERATION AMPLITUDE CONTROL

Anthony Dominic Autorino, Rocky Hill, and Arthur A. Klebba, Thompsonville, Conn., assignors to United Aircraft Corporation, East Hartford, Conn., a corporation of Delaware Filed Dec. 20, 1962, Ser. No. 246,144
3 Claims. (Cl. 331—183)

Our invention relates to a control system for a sweep voltage generator. More particularly, our invention is directed to a synchronization and amplitude control for a saw-tooth wave generator.

In the conventional saw-tooth oscillator, the free-running frequency is determined by the values of the resistance and capacitance which form the integrating circuit across which the saw-tooth voltage is developed. Operation above this frequency is allowed by providing a synchronizing signal for the means, usually a gas-filled tube, through which the capacitor is discharged on the flyback portion of the saw-tooth wave. When a linear sweep voltage is necessary, it is common practice to replace the charging resistor by a constant current device, such as a pentode or other constant current generator, and charge the capacitor through such device. However, as the sweep frequency is increased, there is a corresponding decrease in the maximum amplitude of the sweep voltage. This decrease in amplitude is especially notable and troublesome in cases where it is desired to vary the output frequency of the sweep generator over a wide range.

Our invention overcomes the above discussed disadvantage of the prior art by providing a novel sweep voltage generator in which frequency can be synchronized over a wide range and the amplitude maintained constant throughout this range.

It is therefore an object of our invention to provide a novel sweep voltage generator.

It is another object of our invention to provide a novel saw-tooth voltage generator.

It is a further object of our invention to generate a variable frequency sweep voltage of constant amplitude.

It is also an object of our invention to maintain the magnitude of a saw-tooth voltage constant over a wide range of frequencies.

These and other objects of our invention are accomplished by filtering the output voltage from the saw-tooth wave generator in order to derive a D.C. voltage that is compared with a reference. The difference between the reference and the filtered output voltage of the saw-tooth generator is then integrated to derive a control voltage for an amplitude modulator. The output of the amplitude modulator is detected to derive a variable amplitude signal dependent upon the degree of modulation. The variable amplitude signal is utilized to control the impedance of a network in series with the saw-tooth wave generator to thereby control the amplitude of the saw-tooth output voltage.

Our invention may be better understood and its numerous advantages will become apparent to those skilled in the art by reference to the accompanying drawing wherein like reference numerals apply to like elements in the various figures and in which.

Figures 1, 2:
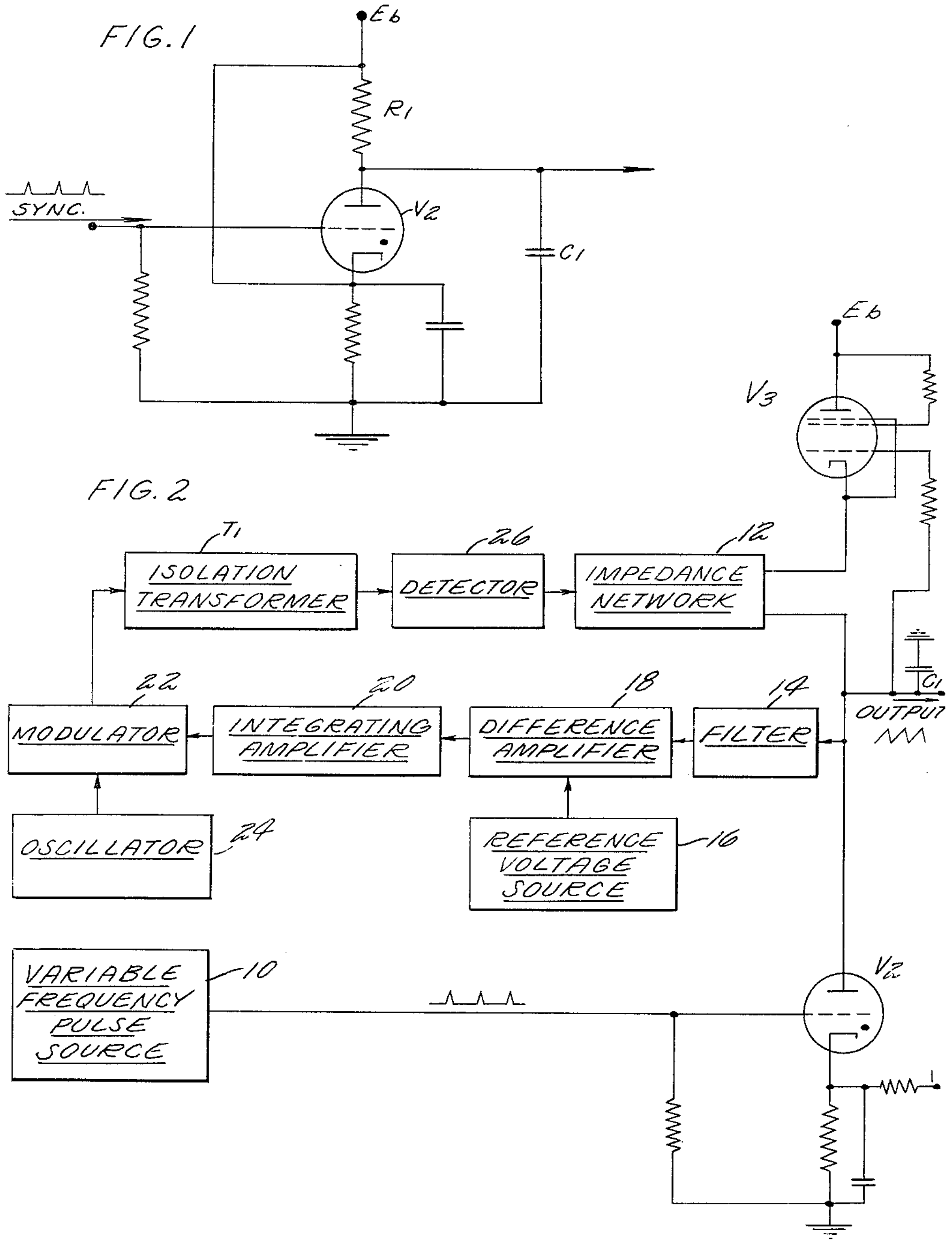
FIGURE 1 illustrates a conventional saw-tooth oscillator of the type well known in the art.
FIGURE 2 is a block diagram of the novel sweep voltage generator which comprises our invention.

Referring now to FIGURE 1, there is shown a widely used form of saw-tooth wave generator in which a voltage $E_b$ is applied to a circuit consisting of a resistance R1 and a capacitance C1 in series. The plate-cathode circuit of a thyratron V2 is shunted across C1 and the tube is biased so that it ionizes at a voltage that is a moderately small fraction of $E_b$. When $E_b$ is first applied to the system, the voltage across C1 rises exponentially according to the time constant of the RC circuit. When a control voltage is received at the grid of tube V2, the thyratron ionizes and C1 discharges quickly through the tube. When the control voltage is removed from the grid of the tube the tube becomes nonconducting and voltage again begins to build up across C1. Since the rising portion of the saw-tooth wave form, which is determined by the time constant of the RC circuit, is the first part of an exponential curve, the slope of the rising portion of the saw-tooth wave form will not be linear. To improve linearity, it is common practice to replace the resistance R1 by an impedance network including a pentode such as V3 of FIGURE 2.

The above described circuit has the deficiency, previously mentioned, that as the frequency of the saw-tooth voltage is increased the maximum amplitude of the output voltage decreases. This is obvious when one considers that the values of R1 and C1 determine the slope of the saw-tooth wave and that these values, once chosen, are fixed while the sweep frequency can be varied by varying the frequency of the ionizing voltage which is applied to the grid of the thyratron to control the discharging of capacitor C1. FIGURE 2 illustrates a novel circuit, which comprises our invention, wherein frequency can be synchronized over a wide range of frequencies and the amplitude of the output saw-tooth wave form still maintained within very close bounds. In FIGURE 2, the ionization of thyratron V2, for purposes of discharging capacitance C1, is controlled by variable frequency pulse source 10. The output saw-tooth wave form is developed across an integrating network comprising capacitance C1, variable impedance network 12 and pentode V3. The saw-tooth output voltage is filtered in filter 14 to derive a D.C. voltage that is compared in difference amplifier 18 with a reference voltage from reference voltage source 16. The difference between the reference voltage and the filtered output voltage is integrated in an integrating amplifier 20 to derive a control voltage for an amplitude modulator 22. The output of difference amplifier 18 is integrated in order to quickly force the error signal to zero. That is, as long as any error exists there is a rapidly increasing or decreasing signal applied to the modulator. This in effect produces a zero error system. In modulator 22, the output of integrating amplifier 20 is used to modulate the sine wave output signal of an oscillator 24. The modulated signal is applied to the primary winding of an isolation transformer T1 and the signal coupled to the secondary winding of this transformer is rectified to D. C. by detector 26. Transformer T1 is necessary to insure that the only source of charging current for capacitor C1 is through pentode V3. The D.C. output signal from detector 26 is applied to impedance network 12 which is in the cathode circuit of charging pentode V3. Application of this D.C. error voltage to network 12 changes the bias on charging pentode V3 and accordingly permits more or less charging current to flow. Thus, the actual effect of the error voltage is to change the total resistance of the RC circuit, which is comprised of the resistance of network 12 and the plate resistance of pentode V3. This change in resistance changes the time constant of the RC circuit and thus the slope of the rising portion of the saw-tooth wave form is changed in such a manner so as to cause it to increase with increases in frequency and decrease with decreases in frequency.

Figure 3:
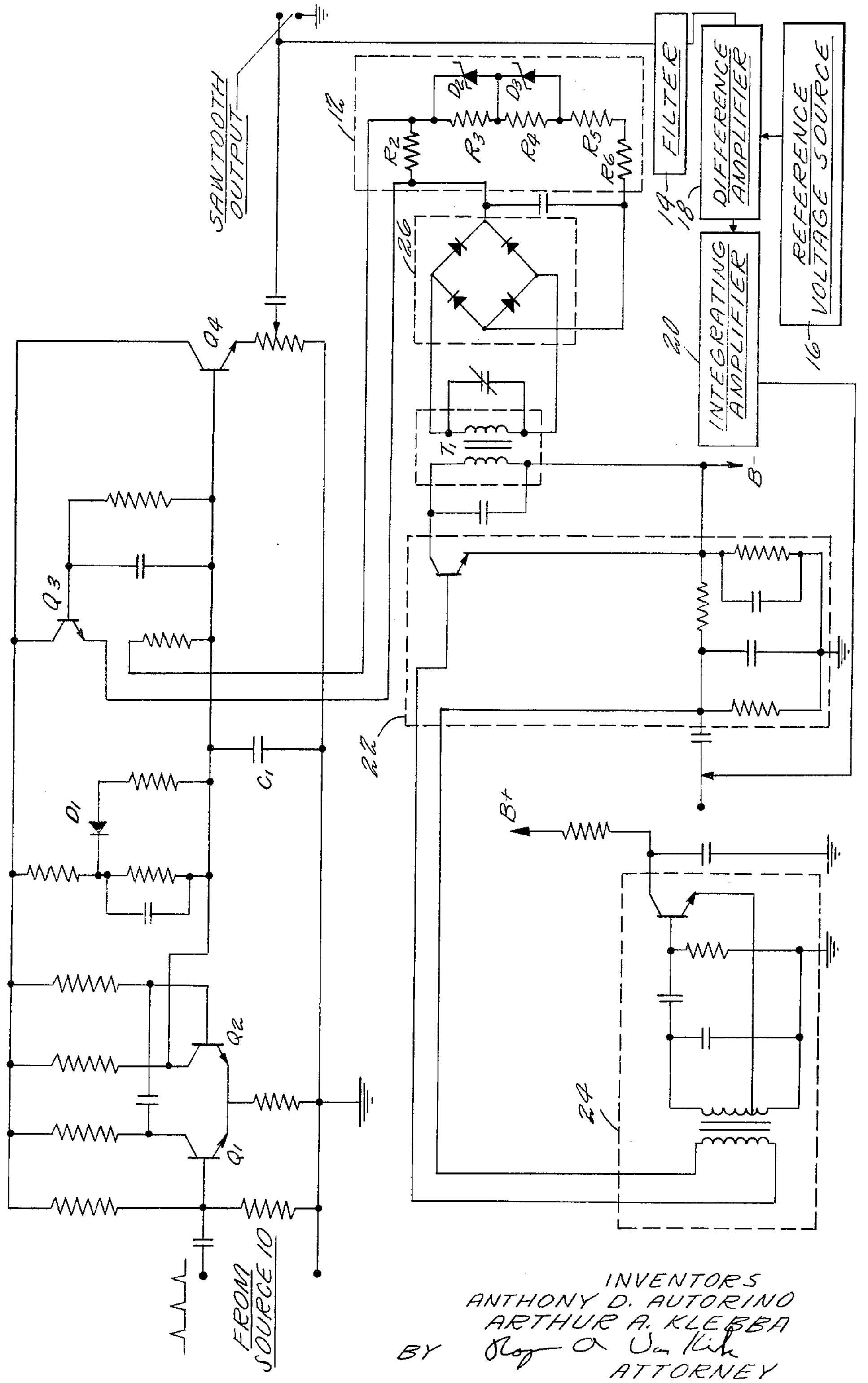
FIGURE 3 is a schematic drawing of a transistorized version of the invention shown in block form in FIGURE 2.

Referring now to FIGURE 3, there is shown a transistorized version of the circuit shown in the block diagram of FIGURE 2. In FIGURE 3, the thyratron V2 of FIGURE 2 has been replaced by a multivibrator comprised of transistors Q1 and Q2. Conduction of transistor Q2 provides a discharge path to ground for capacitor C1. The circuit of FIGURE 3 is otherwise fully equivalent to that of FIGURE 2. That is, the capacitor C1 is charged through charging transistor Q3, which is equivalent to pentode V3, and a variable impedance network 12. The saw-tooth output voltage is taken from emitter follower Q4 and applied to filter 14 and thence to difference ampliger 18 where it is compared with a reference voltage from source 16. The difference signal from amplifier 18 is applied to an amplitude modulator 22 wherein it modulates the sine wave output of transistor oscillator 24. It should be noted that each of these various transistor circuits is individually well known in the art. The output of modulator 22 is applied across the primary winding of isolation transformer T1, the voltage coupled to the secondary winding of T1 is detected by a diode bridge 26 and the D.C. error voltage applied to impedance network 12. Impedance network 12 is comprised of resistors R2 through R6 and a pair of Zener diodes D2 and D3 which respectively are connected in parallel with resistors R3 and R4. As the error voltage from detector 26 increases, diodes D2 and D3 will successively reach their terminal voltages. As is well known in the art, when a Zener diode attains its terminal voltage, it acts as a low impedance voltage source. Thus as the two Zener diodes successively reach their terminal voltages, the impedance of the system decreases thereby allowing greater charging current to flow without exceeding voltage limitations on charging transistor Q3.

While a preferred embodiment has been shown and described, various modifications and substitutions may be made without deviating from the scope and spirit of our invention. For example, various types of sweep generators other than the types shown in our disclosure might be used without departing from the teaching of our invention. Thus our invention is described by way of illustration rather than limitation and accordingly it is understood that our invention is to be limited only by the appended claims taken in view of the prior art.

We claim:

1. A variable frequency sweep voltage generator comprising:

means including a source of current for generating a variable frequency voltage having a desired wave form, means for comparing the magnitude of the generated voltage with reference voltage to produce an error signal, means for integrating the error signal produced by said comparing means, a source of alternating voltage, means for modulating the alternating voltage from said source with the integrated error signal provided by said integrating means, means responsive to said modulated alternating voltage for generating a control signal, and means responsive to said control signal for varying a rate of change of the voltage generated by said variable frequency voltage generating means.

2. The apparatus of claim 1 wherein said control signal generating means comprises:

an isolation transformer having said modulated alternating voltage applied to its primary winding whereby said voltage is isolated from the source of current for said generating means, and means connected to the secondary winding of said transformer for detecting the transformed modulated voltage to provide a control signal.

3. The apparatus of claim 2 wherein the means for varying a rate of change of the voltage generated by said variable frequency voltage generating means comprises:

a variable impedance connected in series with said means for generating a variable frequency voltage and responsive to the output of said detecting means.

References Cited by the Examiner

UNITED STATES PATENTS

| | | | |
|---|---|---|---|
| 2,492,018 | 12/49 | Sunstein | 331—131 |
| 2,715,182 | 8/55 | Bishop | 328—185 |
| 2,728,858 | 12/55 | Ziffer | 331—183 |
| 2,912,652 | 11/59 | Dorney et al. | 331—183 |

ROY LAKE, *Primary Examiner.*

JOHN KOMINSKI, *Examiner.*